(12) United States Patent
Galvin, IV

(10) Patent No.: US 8,522,948 B1
(45) Date of Patent: Sep. 3, 2013

(54) CONCRETE DISPENSING CHUTE EXTENSION

(76) Inventor: James J. Galvin, IV, Wentzville, MO (US)

(*) Notice: Subject to any disclaimer, the term of this patent is extended or adjusted under 35 U.S.C. 154(b) by 298 days.

(21) Appl. No.: 12/849,883

(22) Filed: Aug. 4, 2010

(51) Int. Cl.
 *B65G 11/02* (2006.01)
(52) U.S. Cl.
 USPC .................................. 193/10; 193/5
(58) Field of Classification Search
 USPC ......... 193/10, 4, 5, 25 A, 25 E, 2 R; 414/335
 See application file for complete search history.

(56) References Cited

U.S. PATENT DOCUMENTS

| | | | | |
|---|---|---|---|---|
| 3,249,192 | A * | 5/1966 | Buskirk | 193/4 |
| 3,746,140 | A * | 7/1973 | Schiffelbein | 193/5 |
| 3,866,889 | A * | 2/1975 | Maxon, III | 366/27 |
| 4,007,821 | A | 2/1977 | Schiffelbein | |
| 4,047,604 | A | 9/1977 | Daoust et al. | |
| 4,190,144 | A * | 2/1980 | Lybbert | 193/10 |
| 4,634,285 | A | 1/1987 | Newberry | |
| 4,688,667 | A | 8/1987 | Peterson | |
| 4,919,249 | A | 4/1990 | Alexander | |
| 5,035,313 | A | 7/1991 | Smith | |
| D332,955 | S | 2/1993 | Hull | |
| 5,531,518 | A | 7/1996 | Alves | |
| 5,673,779 | A * | 10/1997 | Spickelmire | 193/6 |
| 6,106,141 | A * | 8/2000 | Bruun | 366/68 |
| 6,845,858 | B2 | 1/2005 | McVay et al. | |
| 7,178,657 | B1 * | 2/2007 | Hafen et al. | 193/4 |
| 7,506,672 | B2 * | 3/2009 | Manno | 141/86 |
| 7,578,379 | B2 * | 8/2009 | Gillmore et al. | 193/5 |
| 2010/0051062 | A1 * | 3/2010 | Fischer et al. | 134/23 |

* cited by examiner

*Primary Examiner* — Gene Crawford
*Assistant Examiner* — Keith R Campbell
(74) *Attorney, Agent, or Firm* — Montgomery Patent & Design; Robert C. Montgomery

(57) ABSTRACT

A concrete dispensing chute extension device for facilitating the pouring of concrete attaches to an end portion of a concrete truck chute and comprises a funnel-shaped lower opening having a cylindrical flexible chute extending directly downward. Concrete is poured down the chute and into the device, the device is directed straight downward into a concrete form. Utilization of the device reduces the impact of the concrete against the sides of the form and the incidents of the form capsizing.

12 Claims, 3 Drawing Sheets

CONCRETE DISPENSING CHUTE EXTENSION

RELATED APPLICATIONS

The present invention was first described in a notarized Official Record of Invention on Apr. 1, 2009, that is on file at the offices of Montgomery Patent and Design, LLC, the entire disclosures of which are incorporated herein by reference.

FIELD OF THE INVENTION

The present invention relates generally to concrete dispensing devices, and in particular, to a chute extension attachable to a dispensing end of a mixed concrete dispensing chute.

BACKGROUND OF THE INVENTION

Poured concrete walls, sidewalks, curbs, steps, footers, foundations and the like are all common components of building and structure construction. They are relatively easy to build, cost-effective, and very long lasting. However, they do require skilled work especially during the form building process to ensure consistent wall thickness and quality of the final product. Even the most sturdy and well constructed form is subject to damage when hit with a powerful flow of mixed concrete. Should the concrete flow hit an upper portion of the form while there is little or no concrete in the lower portion of the form, the form can topple over and cause a structural blowout. Not only are such blowouts time-consuming and costly to repair, but the wasted concrete may mean that there is an inadequate amount of mixed concrete to perform the rest of the pour.

The common practice for building such concrete structures is to mix the cement in a mixer truck and transport the mixed concrete to the concrete forms at a worksite location. The mixed concrete is dispensed from the truck to the form by an elongated concrete dispensing chute which is positioned over the forms. These concrete chutes are typically cumbersome to use, particularly related to proper positioning of the dispensing end in relation to the concrete form. Additionally, it is difficult to control the force in which the flow of concrete impacts the form and control splatter and overflow.

Various types of chute attachments exist attempting to provide solutions to these problems, as can be seen by reference to several U.S. Patents. U.S. Pat. No. 3,746,140, issued in the name of Schiffelbein, discloses a concrete delivery chute attachment having a hopper, a funnel, and an attached flexible tube for providing an outlet for the concrete mixture. U.S. Pat. No. 4,007,812, issued in the name of Schiffelbein, discloses a concrete deliver apparatus having a hopper and an elongated tubular dispensing structure. U.S. Pat. No. 4,047,604, issued in the name of Daoust et al., discloses an appratus for controlling the flow of concrete from a mixer having a gear driven mechanism for positioning an elongated discharge chute. U.S. Pat. No. 4,634,285, issued in the name of Newberry, discloses a portable auxiliary discharge chute assembly for use with mobile concrete mixers for dispensing mixed concrete to a location normally beyond the range of the mixer. U.S. Pat. Nos. 4,688,667, issued in the name of Peterson and 5,531,518, issued in the name of Alves disclose attachments for concrete dispensing chutes for delivering the mixed concrete.

While these devices may accomplish their specific intended purpose, each suffers from one (1) or more disadvantage or deficiency with respect to design, function, or effectiveness. Accordingly, there exists a need for a means by which concrete pours can be accomplished in a controlled manner, thus eliminating the chances of concrete form damage as described above. The development of the present invention substantially departs from the conventional solutions and in doing so fulfills this need.

SUMMARY OF THE INVENTION

In view of the foregoing references, the inventor recognized the aforementioned inherent problems and lack in the art and observed that there is a need for a means to control a flow of mixed concrete from a dispensing chute to a concrete form. Thus, the object of the present invention is to solve the aforementioned disadvantages and provide for this need.

Another object of the present invention is to provide a device which simply attaches to a dispensing end of an existing concrete discharge chute.

Yet another object of the present invention is to provide a device which allows the flow of concrete to dispense at a desired direction, particularly, in a straight downward manner in order to prevent the force of the flow from damaging the form.

Yet another object of the present invention is to provide a device which minimizes splatter and prevents accidental overflow of the concrete mixture.

Yet still another object of the present invention is to provide a device which is simple and intuitive to use with little to no training.

Yet still another object of the present invention is to provide a device which is durable and economical to manufacture.

One (1) or more of these and other objects of the invention are achieved by providing a chute extension device for dispensing a flow of mixed concrete comprising a generally "U"-shaped extension body removably attached to a dispensing end of a concrete chute, a funnel portion protruding from a bottom surface of the extension body, an upper aperture disposed at a central lowermost position of the funnel portion, a funnel stem extending downwardly from the upper aperture, a lower aperture disposed at a terminating end of the funnel stem, a tubular boot connected to the funnel stem, and a boot orifice disposed at a terminating end of the boot for dispensing a flow of mixed concrete. The device also includes a pair of hook features affixed to opposing upper corners of an open end of the extension body. The hook features are removably engaged to a pair of receiving posts protruding from the dispensing end of a concrete chute.

In at least one (1) embodiment of the invention, these objects are achieved by providing the boot having a rigid tubular member. In at least one (1) embodiment the boot includes a flexible tubular sleeve which provides a compliant dispensing nozzle for the concrete mixture.

Furthermore, the described features and advantages of the invention may be combined in various manners and embodiments as one skilled in the relevant art will recognize. The invention can be practiced without one (1) or more of the features and advantages described in a particular embodiment.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

| | |
|---|---|
| 10 | concrete dispensing chute extension |
| 20 | chute extension assembly |
| 22 | main body |
| 24 | closed end portion |
| 26 | open end portion |
| 27 | hook fixture |
| 28 | funnel portion |
| 30 | funnel stem |
| 32 | upper orifice |
| 34 | lower orifice |
| 40 | boot |
| 42 | clamp |
| 44 | boot orifice |
| 100 | concrete |
| 110 | form |
| 120 | concrete truck chute |

DETAILED DESCRIPTION OF THE PREFERRED EMBODIMENT

Figure 1:
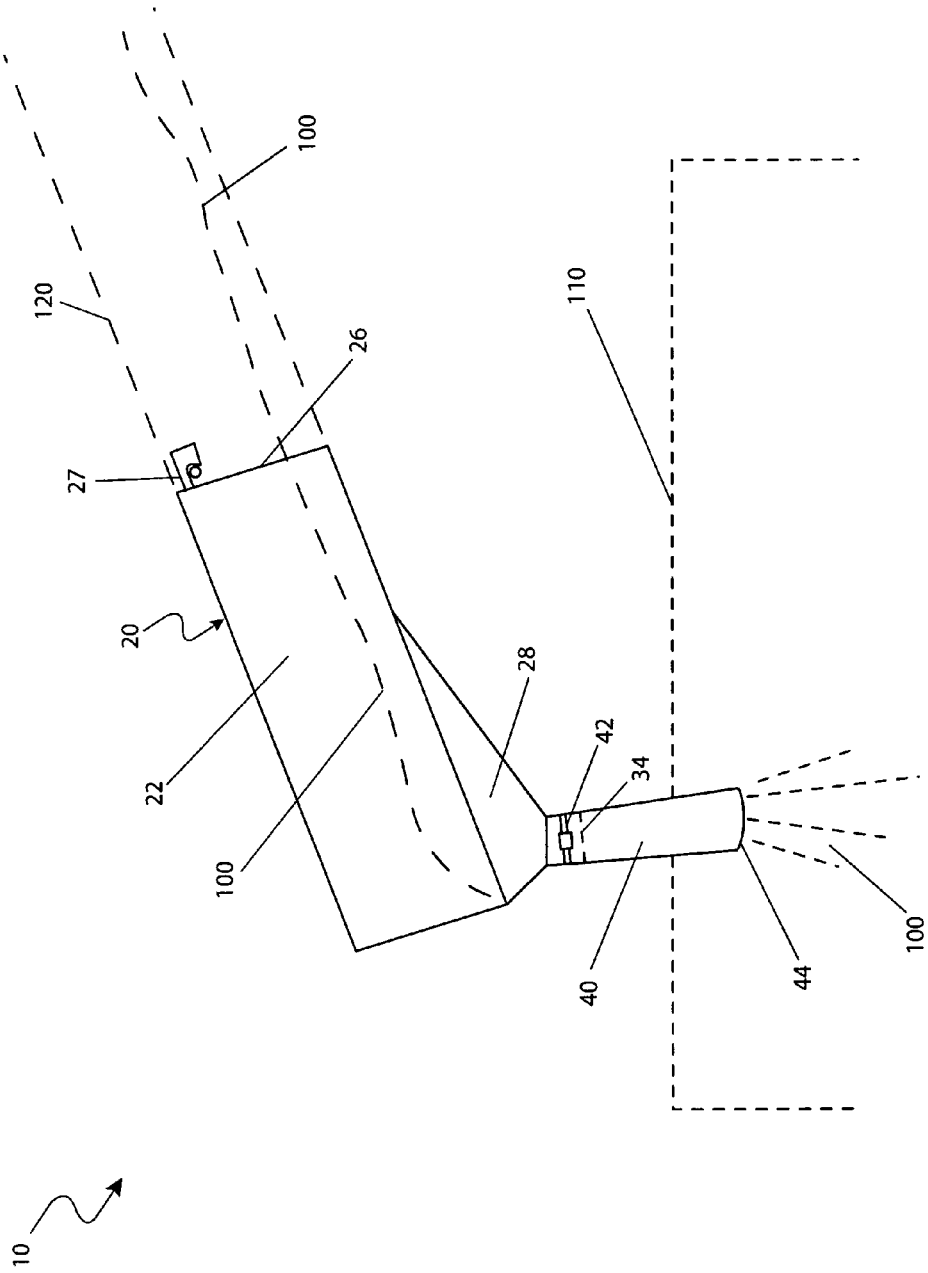
FIG. 1 is a side environmental view of a concrete dispensing chute extension 10, according to a preferred embodiment of the present invention.
Figure 2:
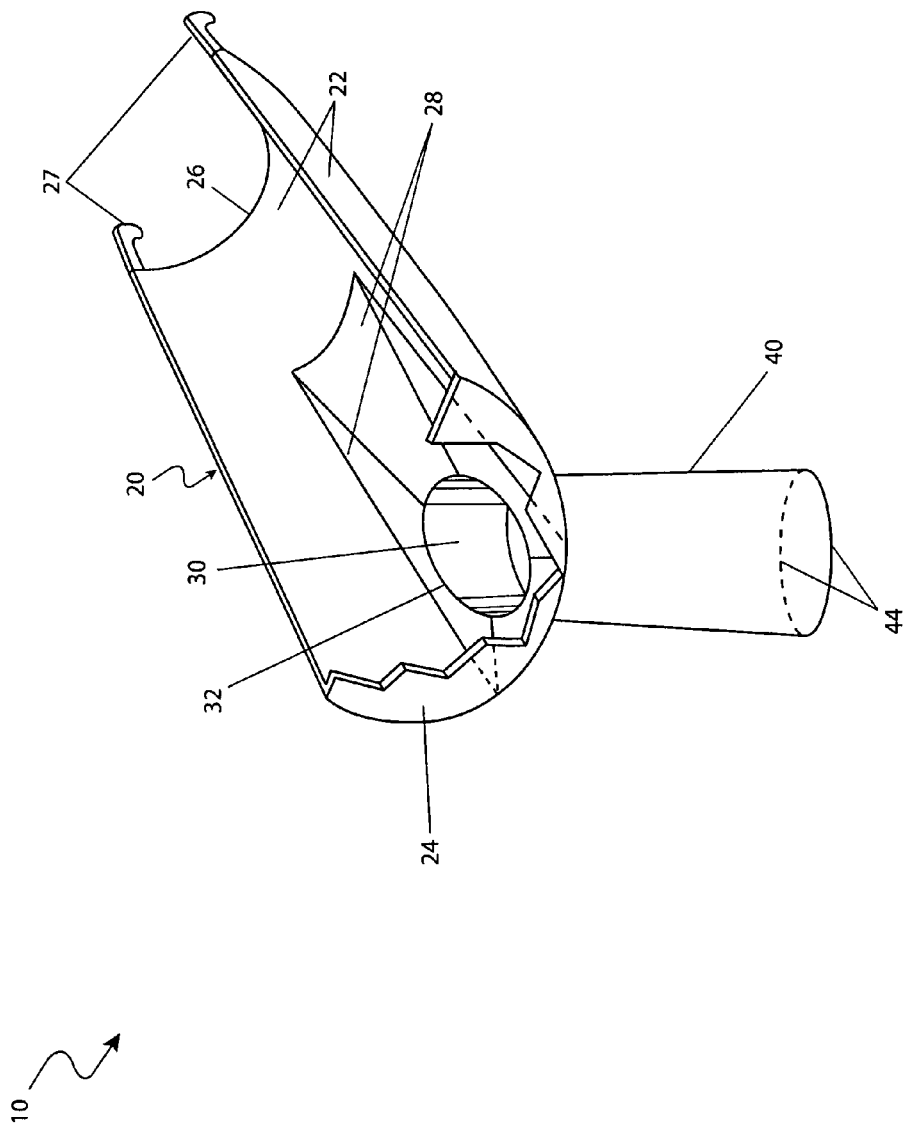
FIG. 2 is a partial cut-away perspective view of the concrete dispensing chute extension 10, according to a preferred embodiment of the present invention; and, FIG. 3 is an upward looking perspective view of the concrete dispensing chute extension 10, according to a preferred embodiment of the present invention.
Figure 3:
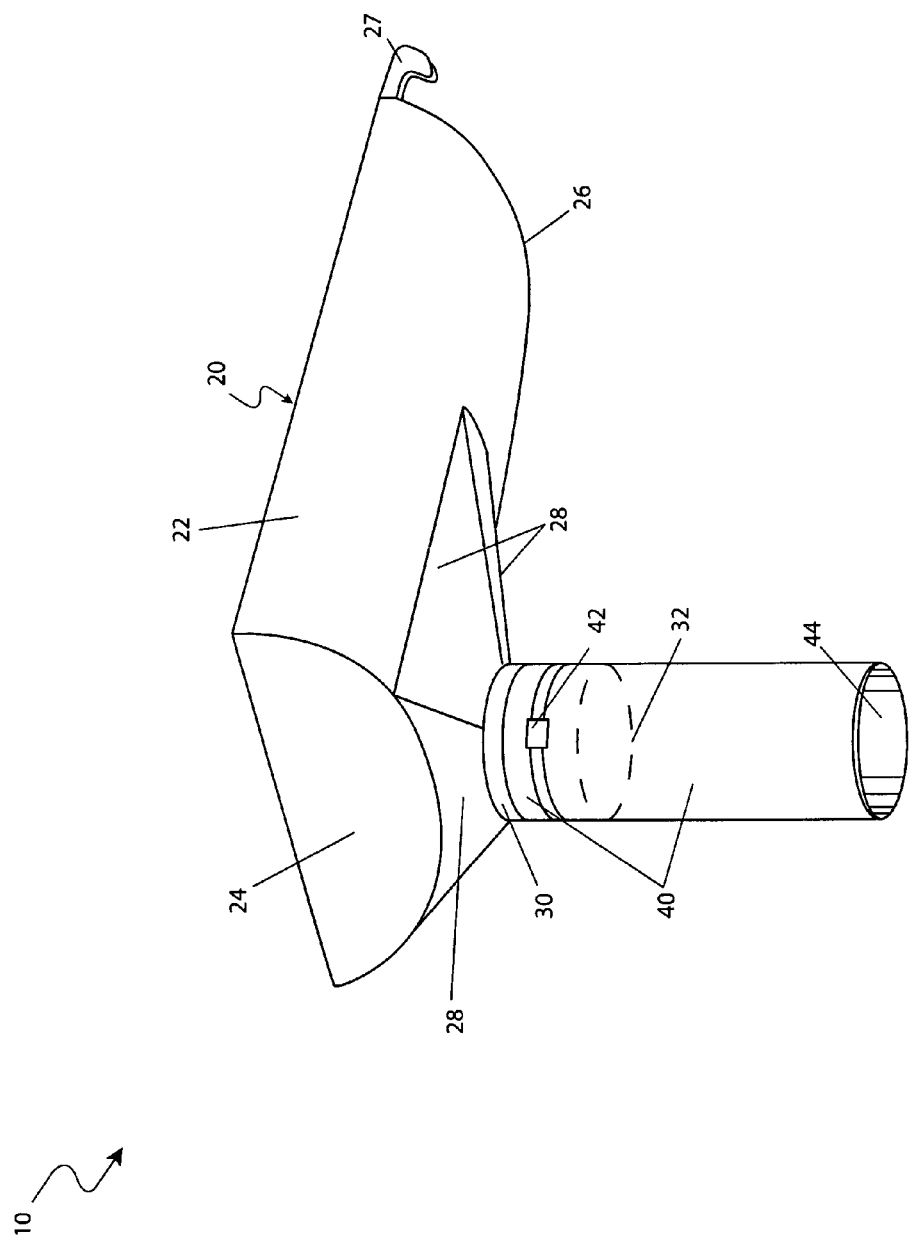

The best mode for carrying out the invention is presented in terms of its preferred embodiment, herein depicted within FIGS. 1 through 3. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a chute extension device for dispensing concrete (herein described as the "device") 10 and a method of use thereof. The device 10 attaches to the outward end of a standard concrete truck chute 120 to facilitate more accurate pouring of a concrete mixture 100.

Referring now to FIG. 1, a side environmental view of the device 10, according to a preferred embodiment of the present invention, is disclosed. The device 10 comprises a funnel portion 28 along a bottom surface having a funnel stem 30 and an attached flexible cylindrical boot 40 which extends directly downward from the funnel stem 30. As a volume of concrete 100 flows down the concrete truck chute 120 and into the device 10, it is redirected straight downwardly through the boot 40 and into a form 110, thereby reducing pouring impact and spillage while equalizing pressure within the form 110 and reducing a possibility of capsizing the form 110.

The boot 40 provides a compliant tubular nozzle to effectively direct the flow of concrete 100 being dispensed therefrom and may also be manipulated by a user to accurately direct the concrete 100 in a targeted manner into various types of concrete forms to construct concrete structures such as, but not limited to: concrete curbs, walls, and the like.

Referring now to FIG. 2, a partial cut-away perspective view of the device 10, according to a preferred embodiment of the present invention, is disclosed. The device 10 comprises a chute extension assembly 20 which further comprises a main body 22, a closed end portion 24, an open end portion 26, a funnel portion 28, and a funnel stem 30. The chute extension assembly 20 comprises a plurality of cut and formed metal plates welded together to form a unitary structure. The chute extension assembly 20 is preferably made using tempered aluminum or other light-weight rugged metal material. The main body portion 22 resembles a linear extension of the existing concrete truck chute 120 comprising a half-cylinder profile being affixed to a proximal end of the concrete truck chute 120 by a pair of integrally welded hook fixtures 27. The hook features 27 removably connect to posts which typically protrude from opposing sides of the proximal end of the concrete truck chute 120. The main body 22 further comprises a closed end portion 24 at a distal end, thereby stopping a horizontal flow of the concrete 100 which is subsequently redirected into the funnel portion 28 of the device 10 as seen in FIG. 1. The main body 22 provides a welded attachment of the funnel portion 28 along a bottom surface at a distal end portion. The funnel portion 28 comprises a tapering metal structure which transitions a concrete flow area from a rectangular opening, weldedly connected to the bottom surface of the main body 22, to a round upper orifice 32 leading into the tapered funnel stem 30. The funnel stem 30 extends downward from the funnel portion 28 and terminates in a round lower orifice 34. The funnel stem 30 directs the flow of concrete 100 to the lower orifice 34 at a bottom end and into the boot 40.

Referring now to FIG. 3, an upward looking perspective view of the device 10, according to a preferred embodiment of the present invention, is disclosed. The device 10 further comprises a boot 40, a boot clamp 42, and a boot orifice 44. The funnel stem 30 is sliding inserted into the boot portion 40. The boot 40 comprises a tube approximately six (6) inches in diameter terminating at the boot orifice 44. The boot 40 is secured to the funnel stem 30 by a hose clamp 42 or equivalent clamping device. The boot 40 is envisioned being made of a flexible material such as, but not limited to: rubber, fabric-reinforced rubber, heavy-duty canvas, or the like. The boot 40 provides a compliant nozzle to effectively direct the flow of concrete 100 being dispensed from the chute extension assembly 20 and can also be manipulated by a user to accurately direct the flow of concrete 100 in a targeted manner.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the device 10, it would be utilized as indicated in FIG. 1.

The method of installing and utilizing the device 10 may be achieved by performing the following steps: attaching the boot portion 40 of the device 10 to the funnel portion 28 using the clamp 42, if not previously attached; attaching the device 10 to an end portion of a concrete truck chute 120 using the hook fixtures 27 in a conventional manner; position the device 10 laterally and vertically above a form 110 which is ready to receive concrete 100; allowing concrete 100 to flow down the concrete truck chute 120 into the device 10; allowing the concrete 100 to flow vertically downward from the boot portion 40 of the device 10 directly into the form 110 until obtaining a desired poured concrete 100 level; continuing to utilize the positioning functions of the concrete truck to dispense additional concrete 100 as need to complete a construction project; and, reducing impact, concrete 100 spillage, and possible capsizing of concrete forms 110 during dispensing of concrete 100 while utilizing the present invention 10.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A chute extension device for dispensing a flow of mixed concrete, said device comprising:
   a generally U-shaped extension body comprising an open top, a closed end, and an open end opposite said closed end and removably attached to and in fluid communication with a dispensing end of a concrete chute;
   a funnel portion comprising a rectangular reservoir protruding from a bottom surface of and in fluid communication with said extension body, said rectangular reservoir comprising four inwardly sloping side walls for directing a flow of mixed concrete, each sidewall of said four sidewalls comprising a planar surface, a first sidewall of said four sidewalls extending proximate said closed end and being disposed at a non-zero first angle with respect to said bottom surface of said extension body, and a second sidewall of said four sidewalls longitudinally opposed to said first sidewall extending toward said open end and being disposed at a non-zero second angle with respect to said bottom surface of said extension body, said second angle being less than said first angle;
   an upper aperture disposed through a lowermost portion of said rectangular reservoir and being configured to receive said flow of concrete from said four sidewalls, said aperture being located proximate said closed end of said extension body;
   a funnel stem extending downwardly from and in fluid communication with said upper aperture;
   a lower aperture disposed at a terminating end of said funnel stem;
   a tubular boot connected to and in fluid communication with said funnel stem; and,
   a boot orifice disposed at a terminating end of said boot for dispensing said flow of mixed concrete.

2. The device of claim 1, wherein said extension body further comprises an arcuate longitudinal member.

3. The device of claim 1, wherein said device further comprises a pair of hook features affixed to opposing upper corners of said extension body; and,
   wherein said hook features removably engage a pair of receiving posts protruding from said dispensing end of a concrete chute.

4. The device of claim 1, wherein said device further comprises a boot clamp disposed over said boot for securing said boot to said funnel stem.

5. The device of claim 1, wherein said boot further comprises a rigid tubular member.

6. The device of claim 1, wherein said boot further comprises a flexible tubular sleeve.

7. The device of claim 3, wherein said device further comprises a boot clamp disposed over said boot for removably securing said boot to said funnel stem.

8. The device of claim 7, wherein said boot further comprises a rigid tubular member.

9. The device of claim 7, wherein said boot further comprises a flexible tubular sleeve.

10. The device of claim 4, wherein said device further comprises a pair of hook features affixed to opposing upper corners of said extension body open end; and,
    wherein said hook features removably engage a pair of receiving posts protruding from said dispensing end of a concrete chute.

11. The device of claim 10, wherein said boot further comprises a rigid tubular member.

12. The device of claim 10, wherein said boot further comprises a flexible tubular sleeve.

* * * * *